United States Patent [19]

Leung et al.

[11] Patent Number: 5,678,505

[45] Date of Patent: Oct. 21, 1997

[54] WARNING DEVICE FOR TRACTOR TRAILER SKIRTS

[76] Inventors: Arthur Leung, 1070 Midway Blvd., Unit 8, Mississauga, Ontario L5T 1T4, Canada; Roscoe H. Carmack, Apt. 16, Liberty Green Apartments, Liberty, Ind. 47353

[21] Appl. No.: 549,978

[22] Filed: Oct. 30, 1995

[30] Foreign Application Priority Data

Mar. 22, 1995 [CA] Canada ................. 2 145269

[51] Int. Cl.$^6$ ................. G08B 5/36; H01H 9/16
[52] U.S. Cl. ................. 116/28 R; 116/202; 200/61.44; 335/205; 340/435
[58] Field of Search ................. 116/28 R, 28 A, 116/202; 200/61.42, 61.44; 335/205, 206, 207; 340/435, 436, 437

[56] References Cited

U.S. PATENT DOCUMENTS

| | | | |
|---|---|---|---|
| 2,482,630 | 9/1949 | Mastromarino | 340/437 X |
| 2,902,671 | 9/1959 | Pitt | 116/28 A |
| 2,927,310 | 3/1960 | Knapp | 200/61.42 |
| 3,265,822 | 8/1966 | Moulton | 200/61.44 |
| 3,322,917 | 5/1967 | Furlow | 335/205 |
| 3,906,442 | 9/1975 | Mosteller | 200/61.44 X |
| 4,040,006 | 8/1977 | Kimmel | 200/61.44 X |

FOREIGN PATENT DOCUMENTS 592531  2/1960  Canada .................. 116/28 A

*Primary Examiner*—William A. Cuchlinski, Jr.
*Assistant Examiner*—Willie Morris Worth

[57] ABSTRACT

The present invention provides a warning device for attachment to a tractor unit for warning when an attached trailer has pivoted to a position where it may cause damage to the tractor. The warning device comprises a base for attachment to a skirt of the tractor unit, the base being adapted at one end for receiving a switch element and also being adapted to receive one end of a resilient connecting element. The device includes a feeler which extends from the device in a position to contact the trailer unit when the trailer unit has pivoted to a potentially skirt contacting position, the feeler being adapted for receiving the second end of the resilient connecting element to connect the base and the feeler. The resilient connecting element joining the base and the feeler of the warning device allows for full movement of the feeler relative to the base in all directions. The switch element is selected such that movement of the feeler in any direction causes activation of the switch and a suitable signalling element electrically connected thereto.

4 Claims, 3 Drawing Sheets

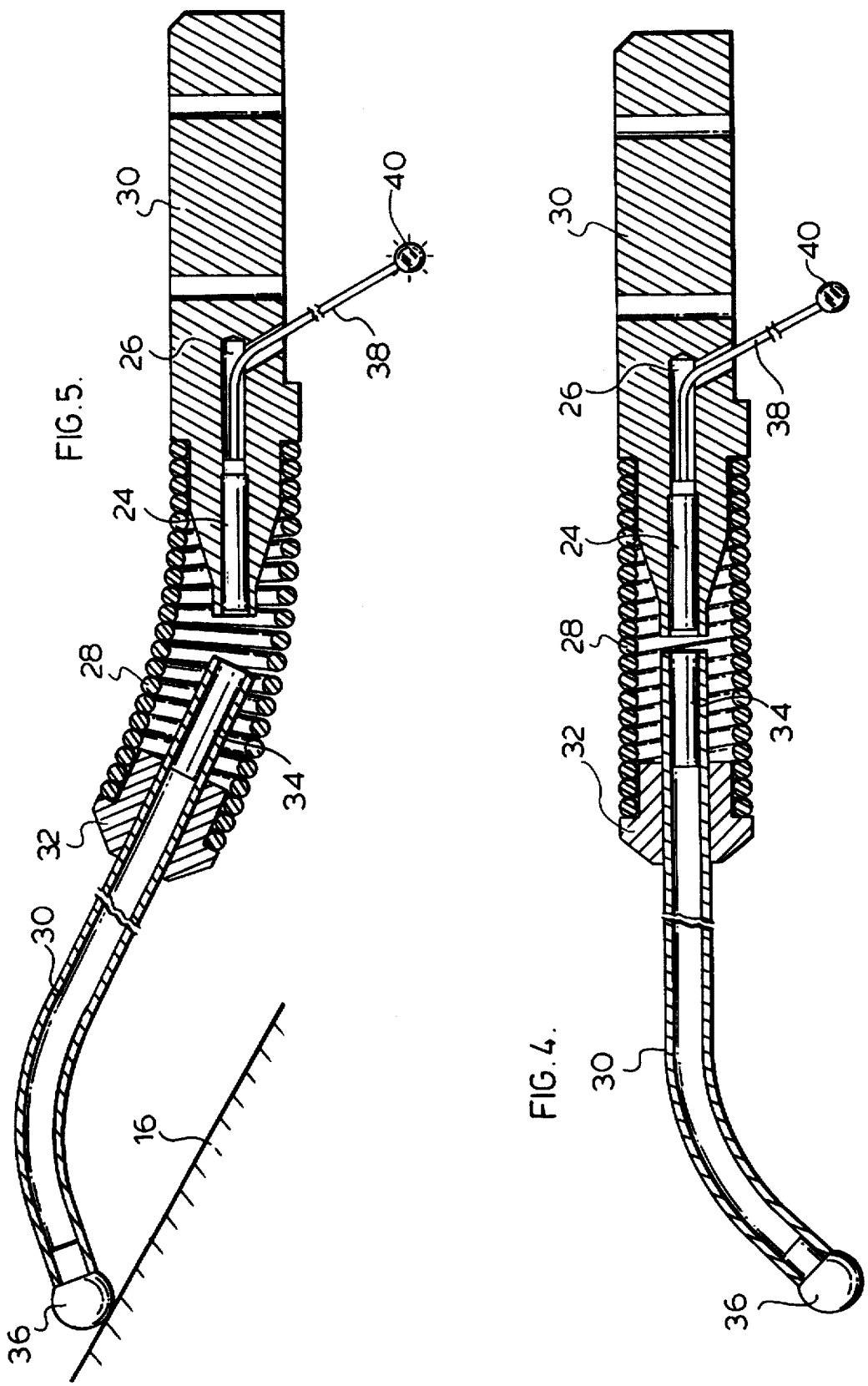

WARNING DEVICE FOR TRACTOR TRAILER SKIRTS

BACKGROUND OF THE INVENTION

The present invention relates to a warning device for attachment to tractor trailers to warn the operator of the tractor is too close to an object to potentially cause damage to the tractor.

FIELD OF THE INVENTION

There are many situations where the tractor of a tractor trailer unit may come too close to an object such that there is a potential of damage to the tractor. In many of these situations the operator may not be aware of the potential danger or may have overlooked it. For example, when backing up tractor trailers in tight spaces, the tractor trailer often must assume a jackknifed position. In such a position, the tractor trailer may end up in a position where the skirt fairing extension of the tractor may come into contact with the trailer and may be damaged or crushed. This position with some tractors may also result in damage to the exhaust stack. The driver may only realize that the tractor is being damaged by the sound of the fairing being crushed by the trailer. Such damage results in expensive repairs and will cause lost use of the tractor while the repairs are being made.

There have been many warning devices proposed for motor vehicles for warning when the vehicle comes too close to a curb, parking structure or, in the case of tractor trailers, an overhead device. Examples of such devices are shown in U.S. Pat. Nos. 1,784,466, 2,130,260, 2,141,844, 2,143,997, 2,520,305, 2,554,371, 2,592,742, 2,808,480, 2,902,671, and Des 337,732. Many of these prior art devices include a switch which is connected to a warning device such as a light or buzzer. The switch is activated when the motor vehicle approaches too close to an obstruction. U.S. Des 337,732, in particular shows a warning signal device for tractor trailer skirts which has a hinged arm which when deflected by the trailer, contacts a switch to complete an electrical circuit. It has been found however, that many such prior devices provide movement in only one direction, and there may be situations where the device will not properly warn of potentially damaging circumstances.

SUMMARY OF THE INVENTION

The present invention provides a warning device for attachment to a tractor unit for warning when the tractor has come so close to an object where it may cause damage to the tractor. The warning device comprises a base for attachment to the tractor unit, the base being adapted at one end for receiving a switch means and also being adapted to receive one end of a resilient connecting means. The device includes a feeler which extends from the device in a position to contact an object when the tractor trailer has come too close to the object so as to potentially cause damage to the tractor trailer. The feeler has an activating means for the switch means and is adapted for receiving the second end of the resilient connecting means to connect the base and the feeler. The resilient connecting means joining the base and the feeler of the warning device allows for full movement of the feeler relative to the base in all directions. The switch means is selected such that movement of the feeler and the activating means in any direction causes activation of the switch and a suitable signalling means electrically connected thereto.

In a preferred embodiment, the present invention provides a warning device for attachment to a tractor unit for warning when an attached trailer has pivoted to a position where it may cause damage to the tractor. The warning device comprises a base for attachment to a skirt of the tractor unit, the base being adapted at one end for receiving a switch means and also being adapted to receive one end of a resilient connecting means. The device includes a feeler which extends from the device in a position to contact the trailer unit when the trailer unit has pivoted to a potentially skirt contacting position, the feeler having an activating means for the switch means and being adapted for receiving the second end of the resilient connecting means to connect the base and the feeler. The resilient connecting means joining the base and the feeler of the warning device allows for full movement of the feeler relative to the base in all directions. The switch means is selected such that movement of the feeler and activating means in any direction causes activation of the switch and a suitable signalling means electrically connected thereto.

BRIEF DESCRIPTION OF THE DRAWINGS

Preferred embodiments of the invention are shown in the drawings, wherein:

FIG. 4 is a top plan view in cross-section of the warning device of FIG. 3 in its resting state; and FIG. 5 is a top plan view in cross-section of the Warning deviec of FIG. 3 in its active state.

DETAILED DESCRIPTION OF THE PREFERRED EMBODIMENTS

Figure 1:
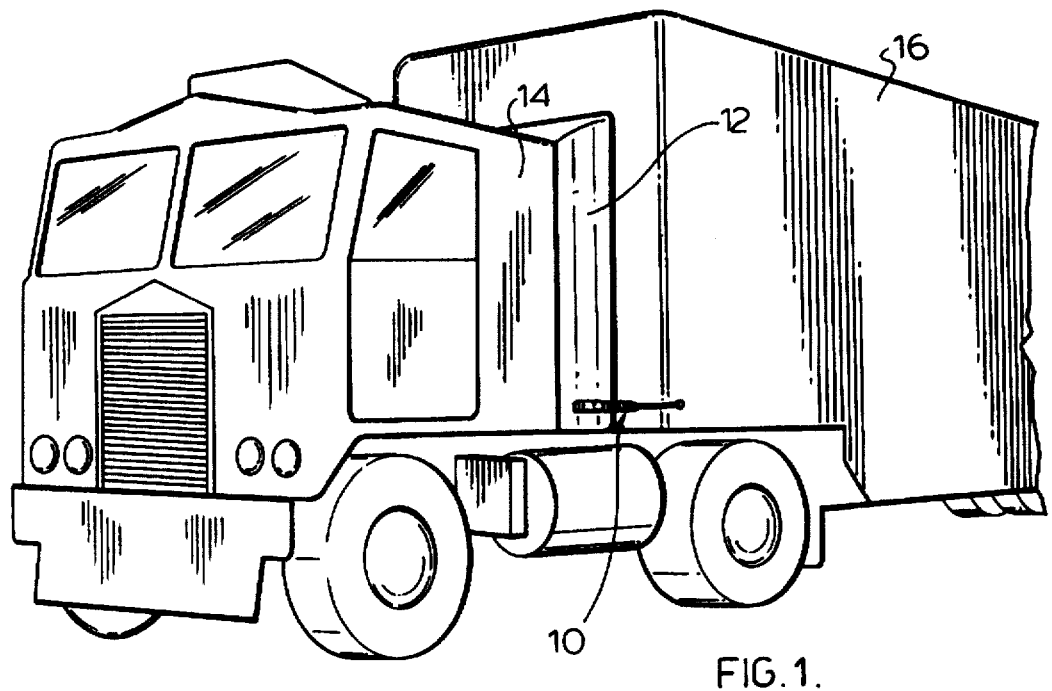
FIG. 1 is a perspective view of a preferred embodiment of the warning device of the present invention attached to a tractor trailer unit.
Figure 2:
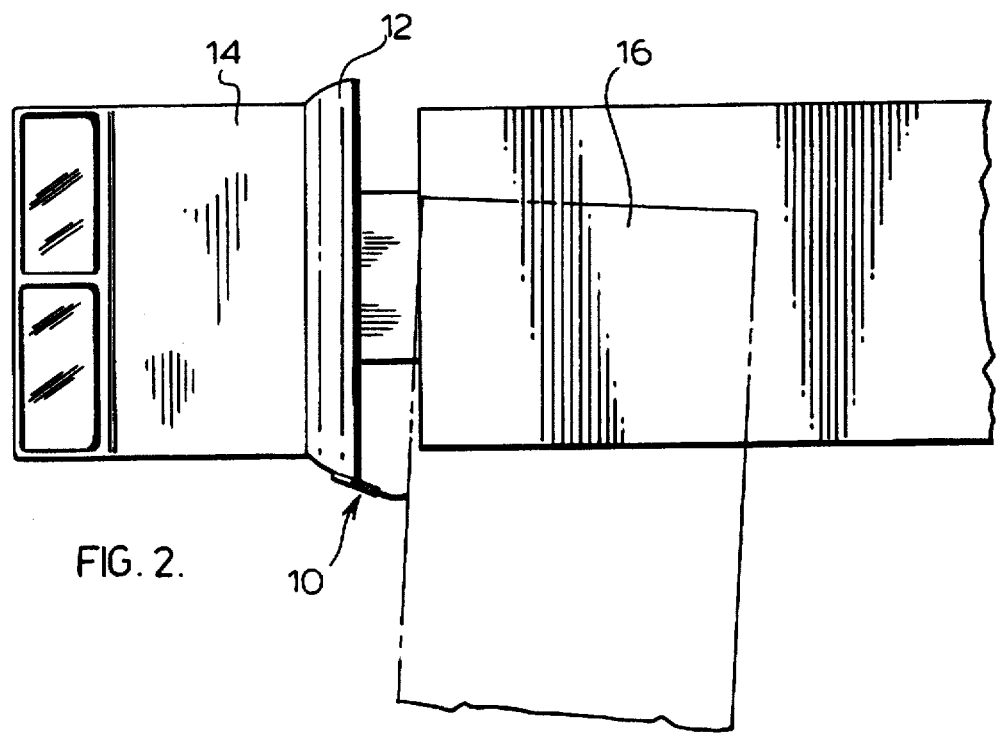
FIG. 2 is top plan view of the tractor trailer unit of FIG. 1 with the warning device attached thereto.

A preferred embodiment of the warning device of the present invention is illustrated in the attached drawings generally indicated by the numeral 10. The warning device attachs to the skirt 12 of a tractor unit 14 and warns the operator of the tractor unit when the attached trailer has pivoted to a position where it may cause damage to the skirt of the tractor 14 as shown in FIG. 2.

Figure 3:
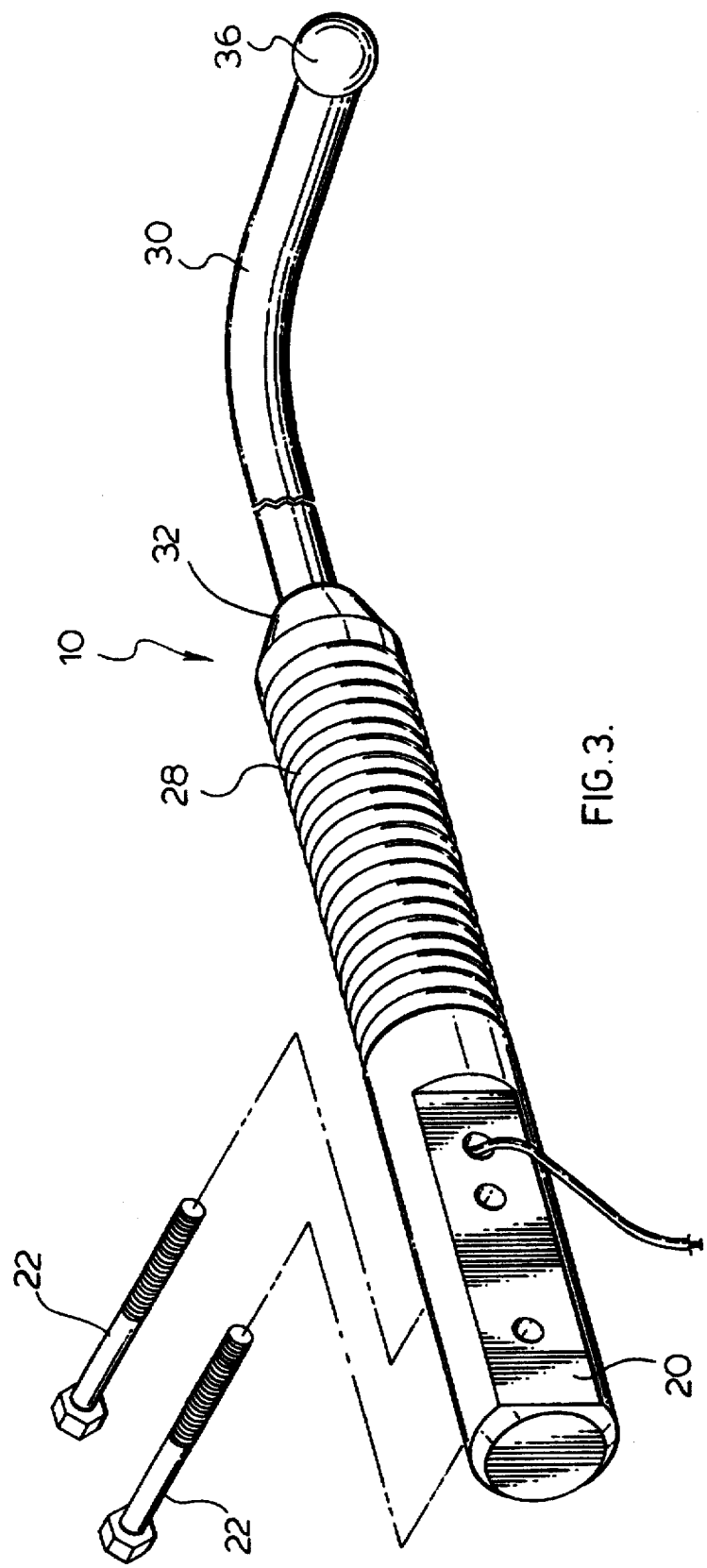
FIG. 3 is a perspective view of the preferred embodiment of the warning device of the present invention.

As shown in FIG. 3, the device 10 has a base 20 for attachment to the skirt 12 by suitable means such as screws or bolts 22. Base 20 is adapted at one end for receiving a suitable switch means 24, further details of which will be explained below. In the embodiment illustrated, the switch means 24 is a magnetic switch and is held in a circular opening 26 in the end of the base 20. The base 20 is also adapted to receive one end of a resilient connecting means 28. Warning device 10 includes a feeler 30 which extends from the device in a position to contact the trailer unit 16 when the trailer unit has pivoted to a potentially skirt contacting position. Feeler 30 is provided with a coupler means 32 for receiving the second end of the resilient connecting means 28. Feeler 30 is also provided with an activating means 34 for the switch means 24 which in the preferred embodiment is a magnet 34 for activating the magnetic switch 24 as will be explained further below. Feeler 30 may be provided with a safety tip 36 for preventing damage to the trailer 16 when the feeler 30 comes into contact with the trailer 16.

In operation, as shown in FIGS. 4 and 5, the warning device 10 is attached to the skirt 12 of the tractor unit 14. A wire 38 from the switch means 24 is fed into the cab of the tractor 14 and connected to a suitable signalling means 40 such as a light or buzzer and the tractor electrical system for powering of the device. When the tractor trailer unit is being backed up, if the unit jackknifes, the feeler 30 makes contact with the trailer 16 and is moved by the motion of the trailer 16. This movement of the feeler 30 results in movement of the magnet 34 in the end of the feeler 30 causing activation of the switch means 24 in the base 12 of the warning device 10. The activation of the switch means 24 causes the signalling means 40 to be activated and alert the tractor driver of the potentially damaging position of the trailer 16.

The resilient connecting means 28 joining the base 20 and the feeler 30 of the warning device 10 allows for full movement of the feeler 30 relative to the base 20 in all directions. This contrasts with the prior art devices which permit movement in only limited directions. In most circumstances, the feeler 30 when contacted by the trailer 16 will be moved outwardly from the tractor unit 14. However, in some situations, the movement of the feeler 30 may be in other than the expected direction, e.g. downwardly, upwardly or even inwardly. By allowing for movement of the feeler 30 in all directions, the warning device 10 of the present invention will be activated and warn the operator irrespective of the direction of movement of the feeler 30. In the preferred embodiment illustrated, the resilient connecting means 28 is a solid wound coil spring, however other types of resilient connecting means 28 can be utilized. Such other resilient connecting means could include for example rubber sleeves or sleeves from other resilient elastomeric materials.

The selection of the switch means 24 of the warning device 10 of the present invention and its positioning also aids in the operation the warning device 10 irrespective of the direction of movement of the feeler 30. The switch means 24 is selected such that movement of the feeler 30 and its associated activating means 34 in any direction causes activation of the switch 24 and is preferrably a proximity type switch. The activation of the switch may be accomplished as a result of a change in the orientation of the axes of the switch means and activating means or as a result of a change in the spacing between the switch means and the activating means. Preferably, the switch means 24 is a proximity switch and is selected such that the longitudinal axes of the switch means 24 and the activating means 34 are in alignment and movement of the feeler 30 causes the longitudinal axis of the activating means 34 to move out of alignment with the longitudinal axis of the switch means 24. The switch means 24 is preferably selected such that the movement out of alignment of the axes causes activation of the switch means 24. One type of switch means 24 which accomplishes this is a magnetic switch and particularly a magnetic reed switch. When the axes of the magnetic reed switch 24 and the magnet 34 associated with the feeler 30 are in alignment, the switch 24 is in an inactive position. Movement of the feeler 30 and the magnet 34 out of this alignment causes movement of the reed in the magnetic reed switch 24 to the active position activating the signalling means 40 of the warning device 10. Such a switch 24 may be a normally open switch where the active position is the closed position to complete the circuit and activate the signalling means 40 or the switch 24 may be a normally closed switch where the open position is the active position and the breaking of the circuit activates the signalling means 40. Other types and designs of switch means 24 which utilize variations in the spacing or gap between the switch means 24 and activating means 34 to accomplish the above desired results will be apparent to those skilled in the art.

While the warning device of the present invention has been described in the preferred embodiment as being attached to the skirt of the tractor for warning of potentially damaging positioning of the trailer, other uses of the device are possible. For example, the warning device could be mounted on the top of the tractor or trailer for warning when the unit is approaching an overhead obstruction which is so low as to potentially cause damage to the unit. Other uses of the warning device of the present invention will be apparent to those skilled in the art.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A warning device for attachment to a tractor for warning when the tractor has come so close to an object where it may cause damage to the tractor, the warning device comprising a base for attachment to the tractor, the base being adapted at one end for receiving a proximity switch a feeler which extends from the device in a position to contact an object when the tractor has come too close to the object so as to potentially cause damage to the tractor, the feeler having an activating means for activating the proximity switch, a resilient connecting means connecting the base and the feeler, the resilient connecting means being attached at one end to the base adjacent the proximity switch and at another end to the feeler; adjacent the activating means, the resilient connecting means joining the base and the feeler of the warning device to allow for full movement of the feeler relative to the base in all directions, the longitudinal axes of the proximity switch and the activating means being in alignment and movement of the feeler in any direction causes the longitudinal axis of the activating means to move out of alignment with the longitudinal axis of the proximity switch thereby activating the proximity switch by a change in the orientation or spacing of the proximity switch relative to the activating means, the movement of the feeler and the activating means in any direction causing activation of the switch and a suitable signalling means for signalling activation of the proximity switch electrically connected thereto.

2. A warning device as claimed in claim 1 wherein the proximity switch is a magnetic reed switch and the activating means is a magnet whereby when the axes of the magnetic reed switch and the magnet associated with the activating means are in alignment, the switch is in an inactive position and movement of the feeler and the magnet out of this alignment causes movement of the reed in the magnetic reed switch to the active position activating the signalling means of the warning device.

3. A warning device for attachment to a tractor for warning when an attached trailer has pivoted to a position where it may cause damage to the tractor, the device comprising a base for attachment to a skirt of the tractor, the base adapted at one end for receiving a proximity switch; a feeler which extends from the device in a position to contact the trailer when the trailer has pivoted to a potentially skirt contacting position, the feeler having an activating means for activating the proximity switch, a resilient connecting means connecting the base and the feeler, the resilient connecting means being attached at one end to the base adjacent the proximity switch and at another end to the feeler adjacent the activating means, the resilient connecting means joining the base and the feeler of the warning device allowing for full movement of the feeler relative to the base in all directions, the longitudinal axes of the proximity switch and the activating means being in alignment and movement of the feeler in any direction causes the longitudinal axis of the activating means to move out of alignment with the longitudinal axis of the proximity switch thereby activating the proximity switch by a change in the orientation or spacing of the proximity switch relative to the activating means, the movement of the feeler and the activating means in any direction causing activation of the proximity switch and a suitable signalling means for signally activation of the proximity switch electrically connected thereto.

4. A warning device as claimed in claim 3 wherein the proximity switch is a magnetic reed switch and the activating means is a magnet whereby when the axes of the magnetic reed switch and the magnet associated with the activating means are in alignment, the switch is in an inactive position and movement of the feeler and the magnet out of this alignment causes movement of the reed in the magnetic reed switch to the active position activating the signalling means of the warning device.

* * * * *